(12) United States Patent
Lin

(10) Patent No.: US 10,183,399 B2
(45) Date of Patent: Jan. 22, 2019

(54) SIX-AXIS MOTION MECHANISM

(71) Applicant: KUN SHAN UNIVERSITY, Tainan (TW)

(72) Inventor: Shueei-Muh Lin, Tainan (TW)

(73) Assignee: Kun Shan University, Tainan (TW)

(*) Notice: Subject to any disclaimer, the term of this patent is extended or adjusted under 35 U.S.C. 154(b) by 269 days.

(21) Appl. No.: 15/174,007

(22) Filed: Jun. 6, 2016

(65) Prior Publication Data
US 2017/0350917 A1  Dec. 7, 2017

(51) Int. Cl.
| | | |
|---|---|---|
| G09B 23/06 | (2006.01) | |
| B25J 11/00 | (2006.01) | |
| G01M 9/00 | (2006.01) | |
| G01M 10/00 | (2006.01) | |

(52) U.S. Cl.
CPC ............. B25J 11/00 (2013.01); G01M 9/00 (2013.01); G01M 10/00 (2013.01)

(58) Field of Classification Search
USPC ........ 434/29, 30, 32, 35, 37, 55, 56, 57, 58, 434/59, 126, 300, 302
See application file for complete search history.

(56) References Cited

U.S. PATENT DOCUMENTS

| | | | | |
|---|---|---|---|---|
| 3,087,257 A | * | 4/1963 | White ................. | A63H 27/04 434/15 |
| 3,542,934 A | * | 11/1970 | Frizell ................. | G09B 9/063 434/29 |
| 5,496,220 A | * | 3/1996 | Engstrand ............ | A63J 5/00 434/55 |
| 5,901,936 A | * | 5/1999 | Bieg .................... | B23Q 1/5462 248/163.2 |
| 6,077,078 A | * | 6/2000 | Alet .................... | F16M 11/046 434/29 |
| 6,733,293 B2 | * | 5/2004 | Baker .................. | G09B 9/08 434/55 |
| 2004/0014011 A1 | * | 1/2004 | Hashimoto .......... | B61K 13/00 434/29 |
| 2010/0216097 A1 | * | 8/2010 | Romagnoli ........... | G09B 9/02 434/35 |
| 2015/0099970 A1 | * | 4/2015 | Schluesselberger, Sen. ............ B25J 17/0208 600/437 |

* cited by examiner

Primary Examiner — Kurt Fernstrom
(74) Attorney, Agent, or Firm — Rosenberg, Klein & Lee

(57) ABSTRACT

A six-axis motion mechanism combines three translation axes in the directions of the X-axis, the Y-axis, and the Z-axis and three rotation axes in the directions of the x-axis, the y-axis, and the z-axis to carry out a six-axis compound motion. The six-axis motion mechanism includes a movable support frame provided with a connecting mechanism. Drive mechanisms are provided in the directions of the X-axis, the Y-axis, and the Z-axis respectively for controlling the displacement, velocity and acceleration of three translation axes. Rotation mechanisms are provided in the directions of the x-axis, the y-axis, and the z-axis respectively for controlling the rotation angles ($\theta$, $\varphi$, $\Psi$), angular velocity, and angular acceleration of the three rotation axes. The six-axis motion mechanism further includes a motion body which can proceed its rotation and displacement at any angle to imitate a single motion of rolling, yawing and pitching and a compound motion.

18 Claims, 10 Drawing Sheets

SIX-AXIS MOTION MECHANISM

FIELD OF THE INVENTION

The present invention relates to a six-axis motion mechanism, and more particularly to a six-axis motion mechanism that combines three translation axes in the directions of the X-axis, the Y-axis, and the Z-axis and three rotation axes in the directions of the x-axis, the y-axis, and the z-axis to carry out a six-axis compound motion. The six-axis motion mechanism comprises drive mechanisms in the directions of the X-axis, the Y-axis, and the Z-axis respectively for controlling the displacement, velocity and acceleration of the three translation axes. The six-axis motion mechanism further comprises rotation mechanisms in the directions of the x-axis, the y-axis, and the z-axis respectively for controlling the rotation angles ($\theta$, $\varphi$, $\Psi$), angular velocity, and angular acceleration of the three rotation axes. The six-axis motion mechanism further comprises a motion body. The motion body can proceed its rotation and displacement at any angle to imitate a single motion of rolling, yawing and pitching and a compound motion of a submarine. In cooperation with the control of the water current in a water channel, the six-axis motion mechanism imitates the complicated motion of the submarine and measures the force and the moment of force in motion to calculate the hydrokinetic parameter of a fluid so as to measure its motion performance. This is beneficial for the development of submarines.

BACKGROUND OF THE INVENTION

A planar motion mechanism of a trial measuring analysis system is used for measuring the hydrodynamic coefficients of a submarine body in motion. This mechanism can be applied to test and analyze the hydrodynamic coefficients of a boat mold on the water.

A conventional planar motion mechanism comprises a (two-axis) horizontal planar motion mechanism (HPMM) and a (three-axis) vertical planar motion mechanism (HPMM). In order to actually measure the motion performance of a submarine body in a fluid, it is necessary to consider the compound motion between the axes. Therefore, as shown in FIG. 1, a (five-axis) dual-pillar VPMM is developed. The dual-pillar VPMM comprises two pairs of two axes for a compound motion and an axis to control respective rotations.

However, the design of the conventional dual-pillar VPMM is directed at the hydrodynamic coefficients of a submarine. The compound motion is done by two axes. There is no compound motion in the direction of the X-axis. Therefore, it is unable to imitate the dynamic motion of the submarine. Furthermore, as shown in FIG. 2 and FIG. 3, the dual-pillar VPMM comprises two pillars 10 each disposed on a joint 20 and coaxially connected with a connecting axle 301 of a submarine body 30. When the dual-pillar VPMM is in a pitching or yawing motion, the space $L_0$ between the two joints 20 at a horizontal position is not equal to the space L between the two joints 20 in a pitching or yawing motion. Thus, if the joints are immovable, the dual-pillar VPMM cannot be in motion. Although the joint 20 is provided with a slide sleeve for a pitching or yawing motion, the joint 20 is still subject to the angle. As a result, the angle of pitching and yawing is limited. After yawing, it is hard for the centroid of the submarine 30 to be at the same position as the original position, which will cause a certain deviation. This will increase the variate to measure the hydrodynamic coefficients and the difficulties in measuring and calculating.

The error value is raised, so the precision of measuring is lowered. Accordingly, the inventor of the present invention has devoted himself based on his many years of practical experiences to solve these problems.

SUMMARY OF THE INVENTION

In order to achieve the aforesaid object, a six-axis motion mechanism is provided. The six-axis motion mechanism comprises a movable support frame. The support frame is provided with a connecting mechanism. The connecting mechanism defines three translation axes in the directions of the X-axis, the Y-axis, and the Z-axis respectively and three rotation axes in the directions of the x-axis, the y-axis, and the z-axis respectively. The connecting mechanism is provided with drive mechanisms in the directions of the X-axis, the Y-axis, and the Z-axis respectively for controlling the displacement, velocity and acceleration in the directions of the X-axis, the Y-axis, and the Z-axis respectively. Rotation mechanisms are provided in the directions of the x-axis, the y-axis, and the z-axis respectively for controlling rotation angles ($\theta$, $\varphi$, $\Psi$), angular velocity, and angular acceleration in the directions of the x-axis, the y-axis, and the z-axis respectively. The drive mechanisms and the rotation mechanisms are pivotally connected with each other.

Wherein, the drive mechanisms comprise a first drive mechanism, a second drive mechanism, and a third drive mechanism. The rotation mechanisms comprise a first rotation mechanism, a second rotation mechanism, and a third rotation mechanism.

Wherein, the first drive mechanism is to control the displacement, velocity and acceleration in the direction of the Z-axis. The first drive mechanism is connected with a platform to actuate the platform in the direction of the Z-axis. The first drive mechanism further comprises a base. The base is disposed on top of the platform. The base is provided with a first drive motor and pivotally connected with a first screw rod. The first drive motor is connected with and drives a driving gear. A top of the support frame is formed with a threaded hole. The screw rod is screwed to the threaded hole. The first screw rod is coaxially provided with a driven gear. The driving gear meshes with the driven gear to drive the driven gear. The first screw rod is threaded to the threaded hole to drive the platform for the displacement, velocity and acceleration in the direction of the Z-axis.

Preferably, the support frame is provided with at least one second slide rod at one side thereof. The second slide rod is provided with a third slide block. The third slide block is connected with the platform to keep the stability and precision of ascent and descent of the platform, so that the platform won't be shaken and deflected by an external force.

Wherein, the second drive mechanism is to control the displacement, velocity and acceleration in the direction of the Y-axis. The second drive mechanism is disposed at the bottom of the platform. The second drive mechanism comprises a second drive motor. The second drive motor is connected with and drives a second screw rod. The second screw rod is threadedly disposed to drive a first slide block. The first slide block has a connecting hole for connection of the second screw rod. One side of the first slide block is provided with the third drive mechanism. Two sides of the bottom end of the platform are provided with two slide rails. The first slide block is slidably mounted on one of the two slide rails. A second slide block is slidably provided on the other of the two slide rails. The second slide block is connected with the third drive mechanism, such that the first slide block, the second slide block, and the third drive mechanism are moved synchronously to keep the stability and precision of the motion. When the second drive motor is running, the second screw rod is driven to turn. Through the second screw rod screwed to the connecting hole of the first slide block, the first slide block and the second slide block can slide on the slide rails so as to control the displacement, velocity and acceleration in the direction of the Y-axis of the third drive mechanism and the slide.

Wherein, the third drive mechanism is to control the displacement, velocity and acceleration in the direction of the X-axis. The third drive mechanism is disposed at the bottom of the platform. The third drive mechanism comprises a third drive motor. The third drive motor is connected with and drives a third screw rod. The third screw rod is connected with the second slide block and idle. The slide has another connecting hole. The third screw rod is screwed to the connecting hole of the slide to drive the slide. At least one first slide rod is provided between the first slide block and the second slide block. The slide has a through hole corresponding to the first slide rod. The first slide rod is mounted to the slide through the through hole so as to enhance the stability and precision of the motion in the direction of the X-axis. When the third drive motor is running, the third screw rod is driven to turn. The third screw rod is screwed to the connecting hole of the slide to drive the slide so as to control the displacement, velocity and acceleration in the direction of the X-axis of the slide.

Wherein, the first rotation mechanism is to control the rotation angle θ, angular velocity and angular acceleration in the direction of the x-axis. The first rotation mechanism comprises a first pivot motor disposed at the bottom end of the slide. The first pivot motor is connected with and drives a first driving shaft. The first driving shaft is connected to a first pivot member. The first pivot member is provided with the second rotation mechanism, enabling the first rotation mechanism to rotate and actuate each component of the second rotation mechanism in the direction of the x-axis.

Wherein, the second rotation mechanism is to control the rotation angle Ψ, angular velocity and angular acceleration in the direction of the y-axis. The second rotation mechanism comprises a second pivot motor disposed in the first pivot member. The second pivot motor is connected with and drives a second driving shaft. The second driving shaft is connected to a second pivot member. The second pivot member is provided with the third rotation mechanism, enabling the second rotation mechanism to rotate and actuate each component of the third rotation mechanism in the direction of the y-axis.

Wherein, the third rotation mechanism is to control the rotation angle Ψ, angular velocity and angular acceleration in the direction of the z-axis. The third rotation mechanism comprises a third pivot motor disposed in the second pivot member. The third pivot motor is connected with and drives a third driving shaft. The third driving shaft is connected with and drives the motion body, enabling the third rotation mechanism to actuate the motion body.

Wherein, the third driving shaft is connected to the centroid of a motion body. The motion member can be a submarine body, such as a submarine. The present invention may be disposed in a fluid, such as a wind tunnel or a water channel. The present invention combines the three translation axes in the directions of the X-axis, the Y-axis, and the Z-axis and the three rotation axes in the directions of the x-axis, the y-axis, and the z-axis to carry out a six-axis compound motion, including the displacement, velocity and acceleration of the X-axis, the Y-axis, and the Z-axis and the rotation angle (θ, φ, Ψ), angular velocity, and angular acceleration of the x-axis, the y-axis, and the z-axis. Thereby, the submarine can proceed its rotation and displacement at any angle, without any limitation. In a specific embodiment, when the centroid O is immovable, the submarine can be controlled for its rotation, yawing, and pitching to imitate a single motion of rolling, yawing and pitching and a compound motion of the submarine. In cooperation with the control of the water current in the wind tunnel or the water channel, the six-axis motion mechanism imitates the complicated motion of the submarine and measures the force and the moment of force in motion to calculate the hydrokinetic parameter of a fluid so as to measure its motion performance. This is beneficial for the development of submarines.

Furthermore, the support frame is provided with a counterweight device. The counterweight device is connected with the platform to support the platform. The counterweight device comprises at least one pulley set, a driving wire, and a counterweight member. The pulley set is disposed on the support frame. The driving wire is disposed around the pulley set. One end of the driving wire is connected to the platform, and another end of the driving wire is connected to the counterweight member. The weight of the counterweight member is substantially equal to the weight supported by the platform minus the weight of the motion body. When the first drive motor is actuated, the torsion of the first drive motor is controlled, directed at the weight of the submarine body itself. This is beneficial to record and measure the parameter of the fluid.

DESCRIPTION OF THE PREFERRED EMBODIMENTS

Figure 1:
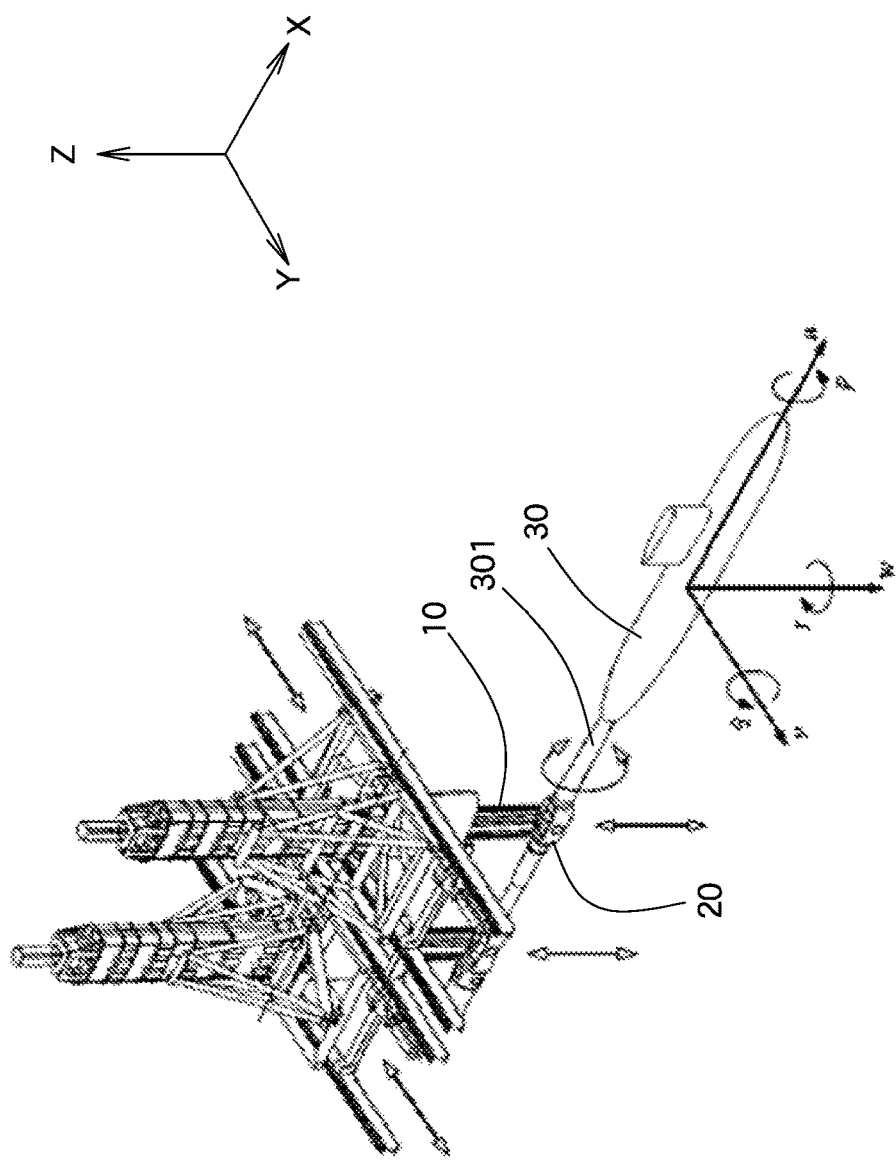
FIG. 1 is a schematic view of a conventional dual-pillar VPMM.
Figure 2:
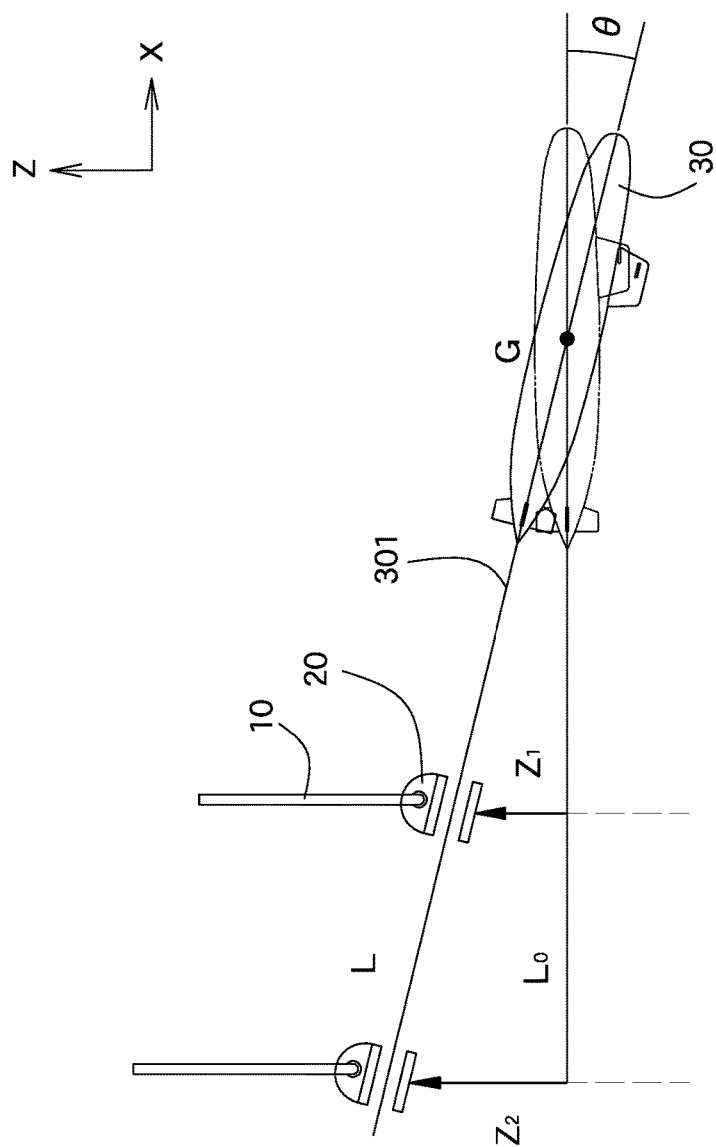
FIG. 2 is a dynamic schematic view of the conventional dual-pillar VPMM in a pitching motion.
Figure 3:
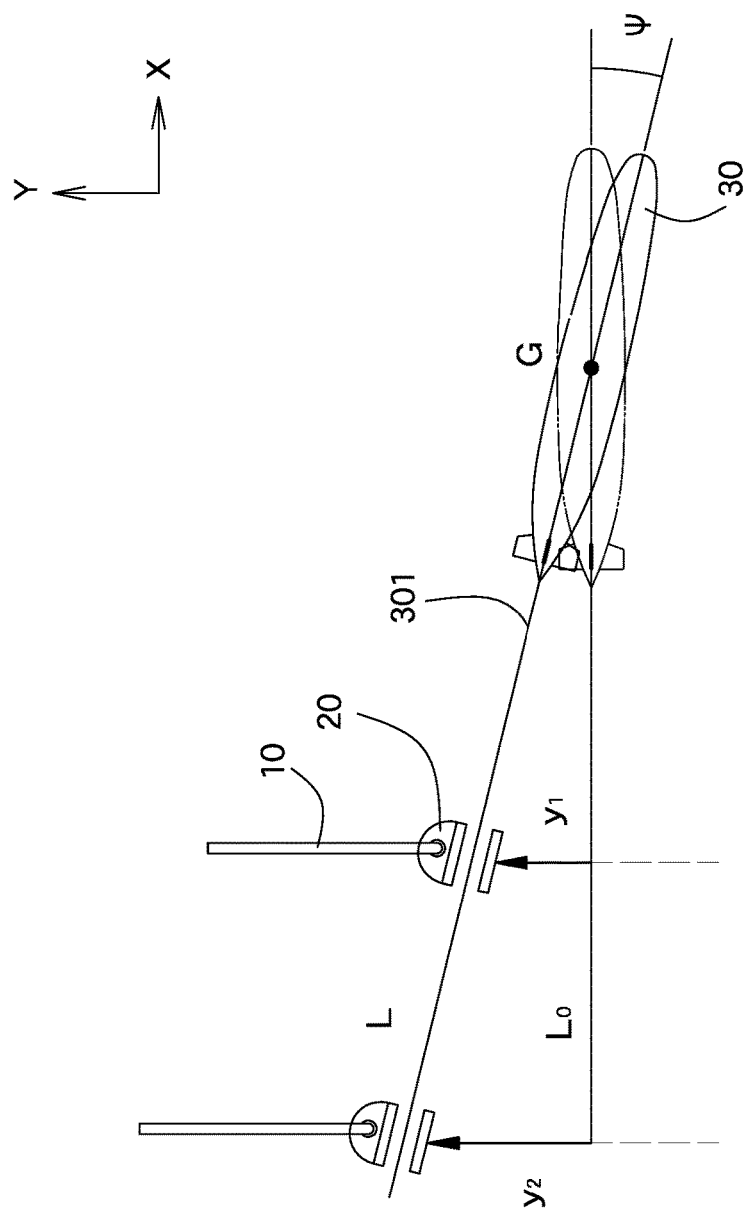
FIG. 3 is a dynamic schematic view of the conventional dual-pillar VPMM in a yawing motion.
Figure 4:
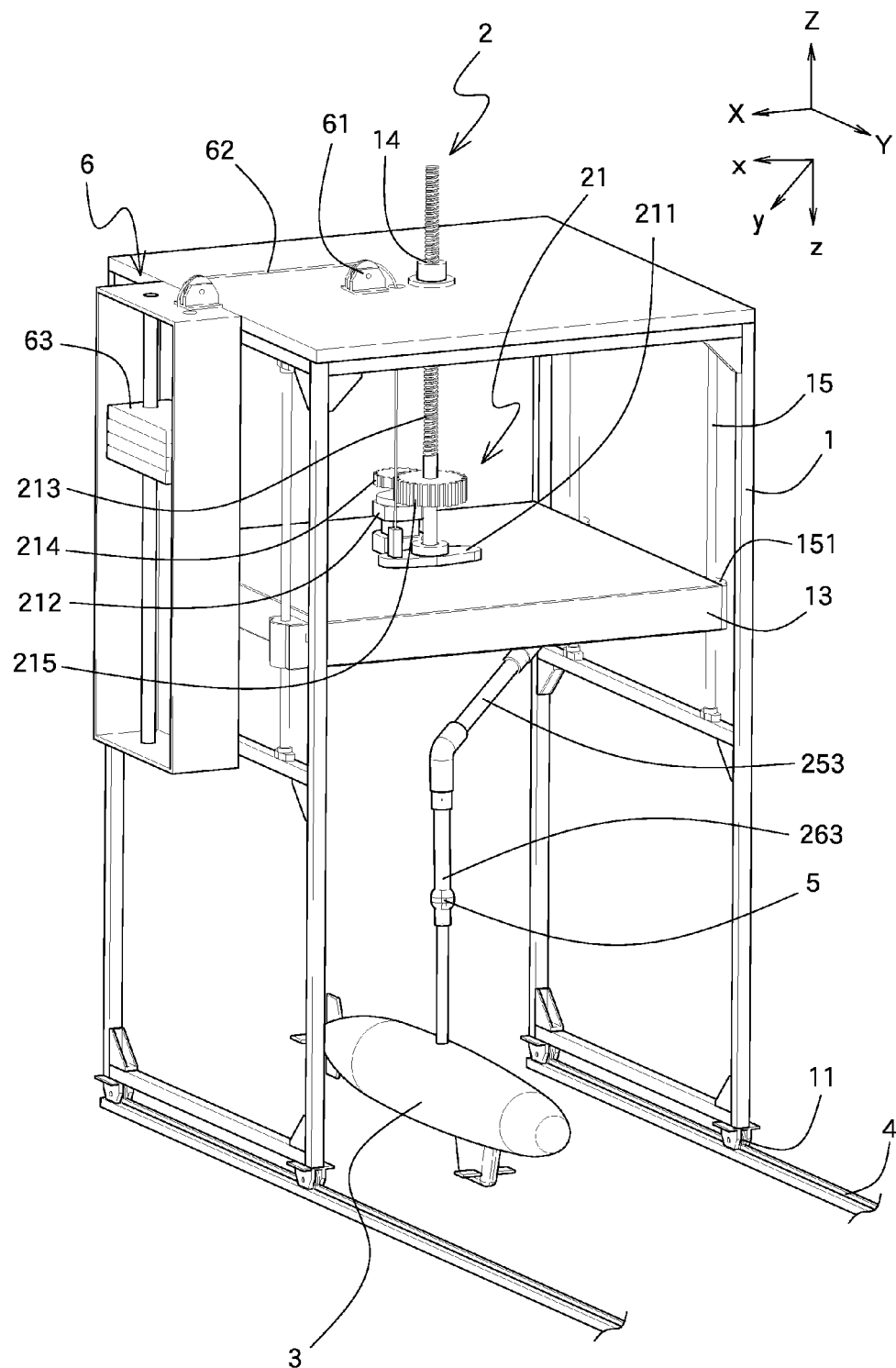
FIG. 4 is a perspective view of the present invention.
Figure 5:
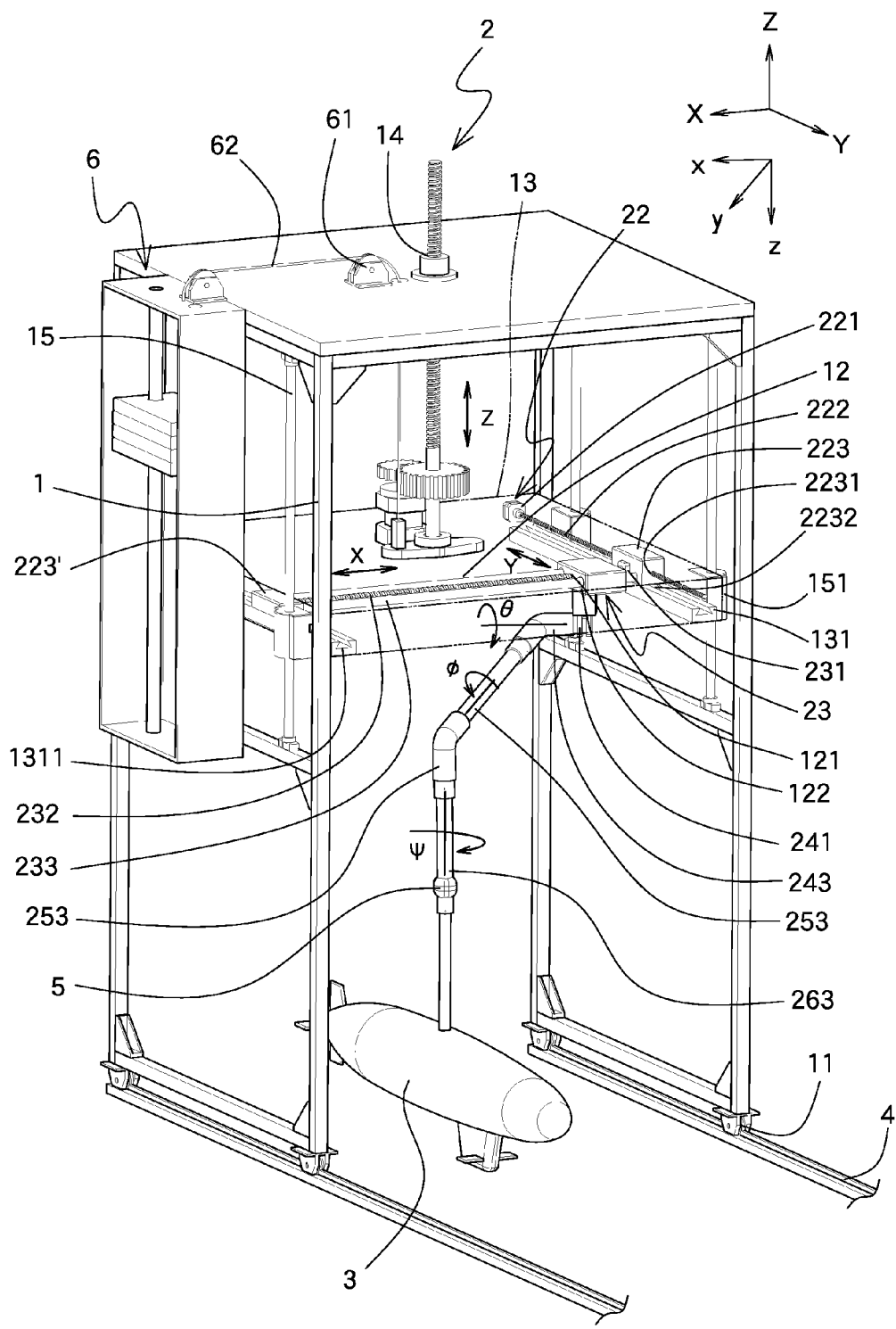
FIG. 5 is a perspective view of the present invention, showing the interior structure of the platform.
Figure 6:
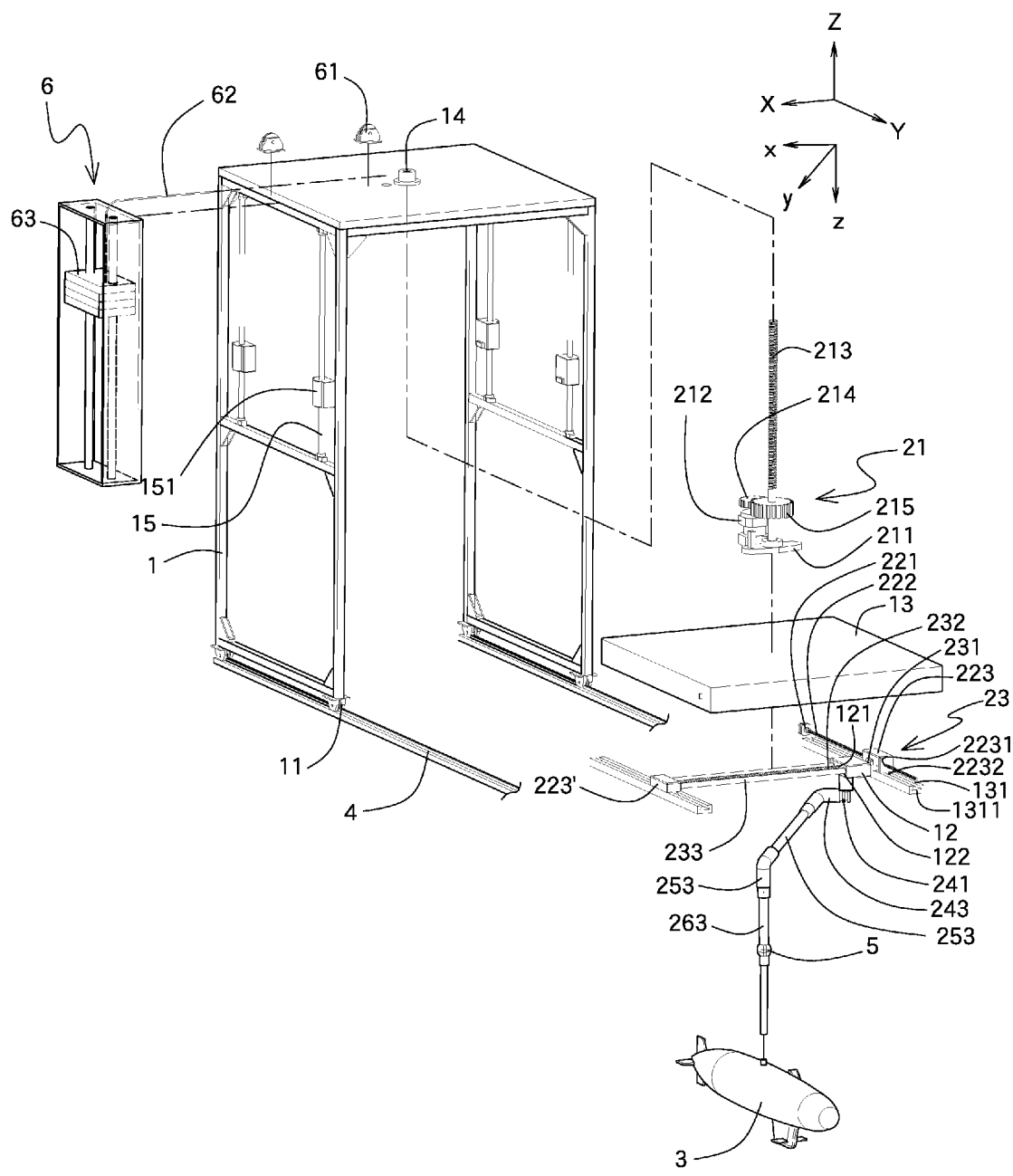
FIG. 6 is an exploded view of the present invention.
Figure 7:
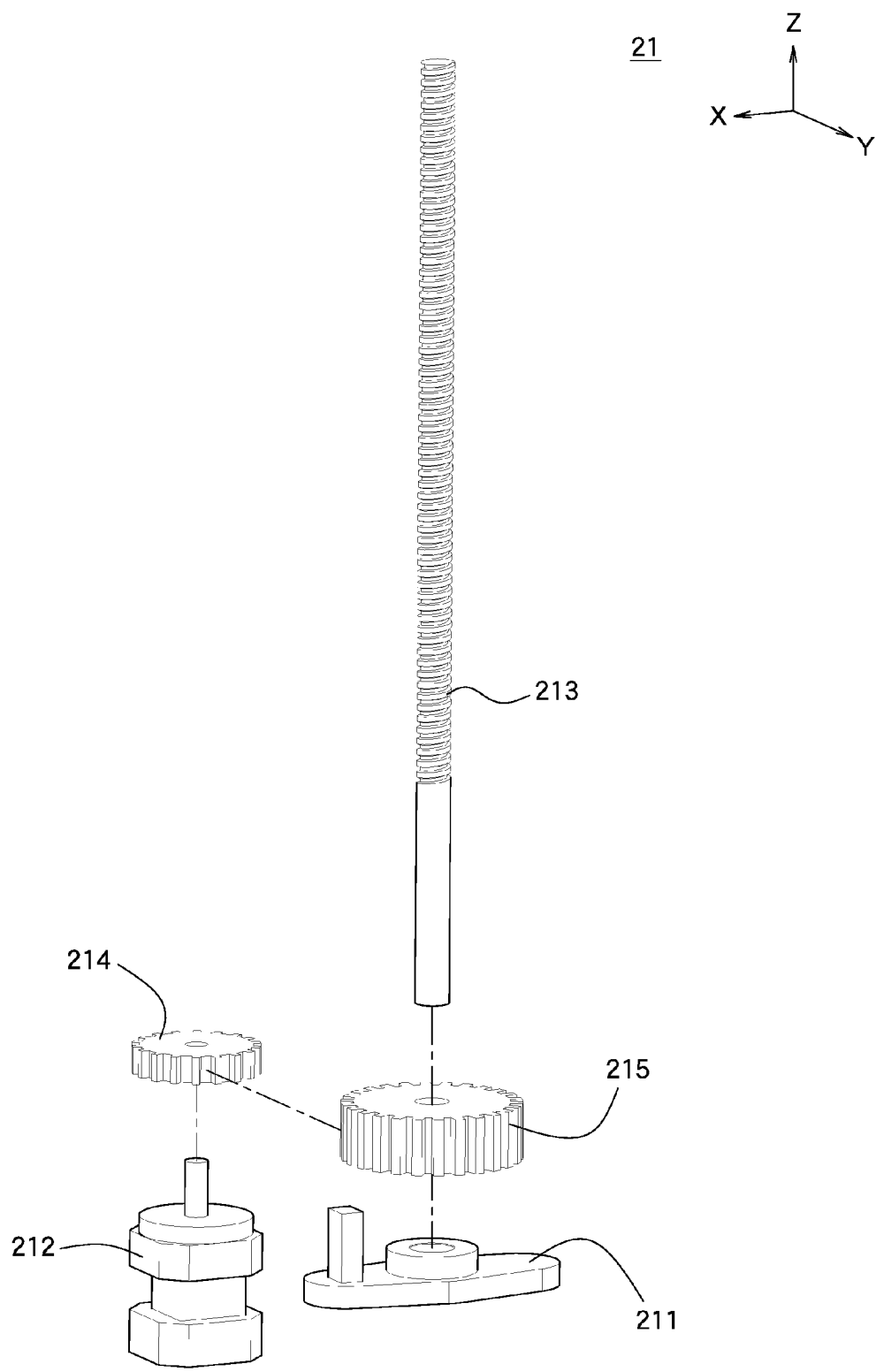
FIG. 7 is an exploded view of the first drive mechanism of the present invention.
Figure 8:
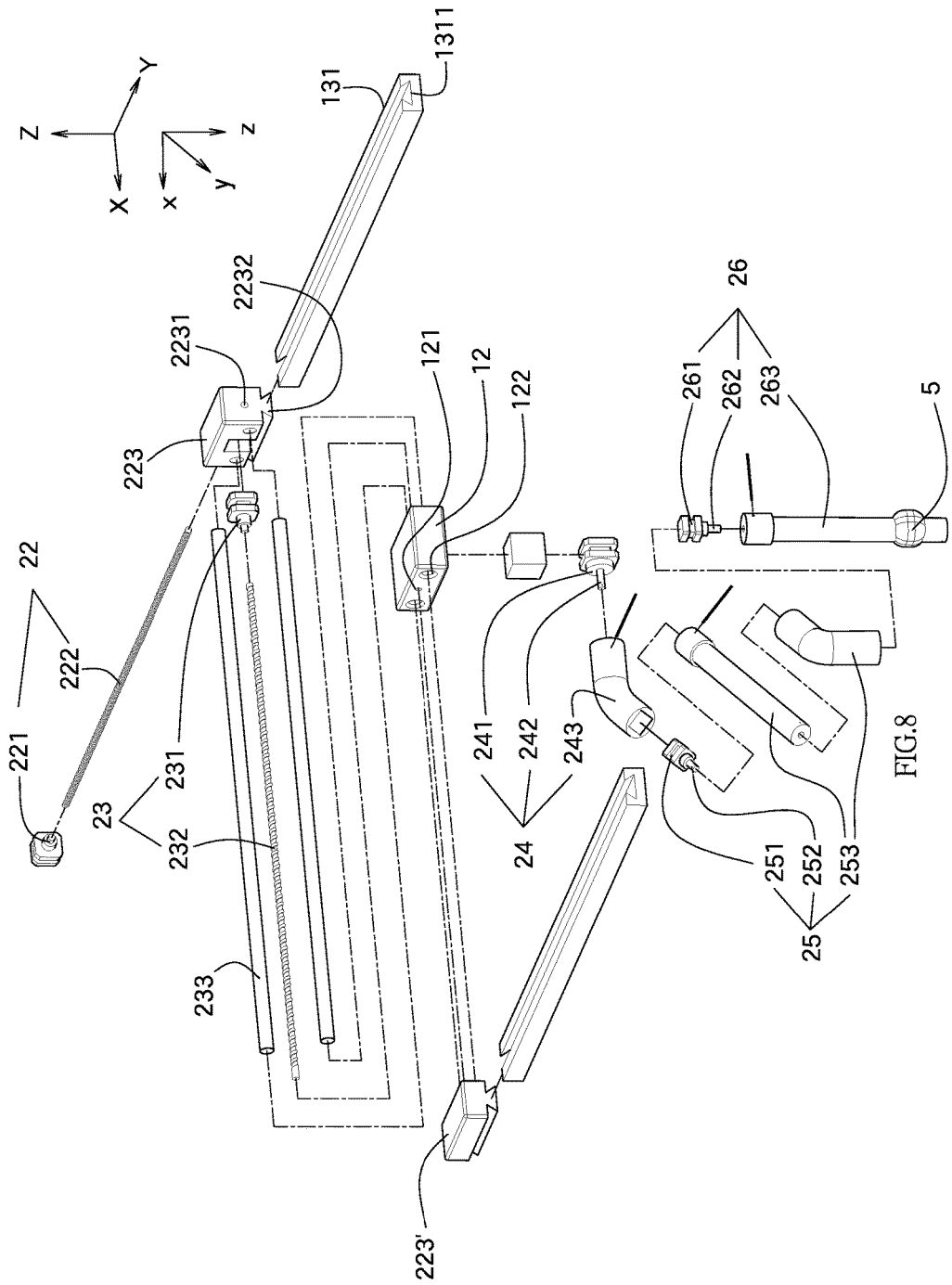
FIG. 8 is an exploded view of the second and third drive mechanisms and the first, second and third rotation mechanisms of the present invention.

Embodiments of the present invention will now be described, by way of example only, with reference to the accompanying drawings.

Referring to FIG. 4 through FIG. 8, the present invention discloses a six-axis motion mechanism. The six-axis motion mechanism comprises a movable support frame 1. The support frame 1 is provided with a connecting mechanism 2. The connecting mechanism 2 defines three translation axes in the directions of the X-axis, the Y-axis, and the Z-axis respectively, and three rotation axes in the directions of the x-axis, the y-axis, and the z-axis respectively. The connecting mechanism 2 is provided with drive mechanisms in the directions of the X-axis, the Y-axis, and the Z-axis respectively for controlling the displacement, velocity and acceleration in the directions of the X-axis, the Y-axis, and the Z-axis respectively. Rotation mechanisms are provided in the directions of the x-axis, the y-axis, and the z-axis for controlling the rotation angles (θ, φ, Ψ), angular velocity, and angular acceleration in the directions of the x-axis, the y-axis, and the z-axis. The drive mechanisms and the rotation mechanisms are pivotally connected with each other.

The drive mechanisms includes a first drive mechanism 21 actuating in the direction of the Z-axis, a second drive mechanism 22 actuating in the direction of the Y-axis, and a third drive mechanism 23 actuating in the direction of the X-axis. The rotation mechanisms comprise a first rotation mechanism 24 actuating in the direction of the x-axis, a second rotation mechanism 25 actuating in the direction of the y-axis, and a third rotation mechanism 26 actuating in the direction of the z-axis. The first, second and third drive mechanisms 21, 22, 23 and the first, second, and third rotation mechanisms 24, 25, 26 are connected with one another.

The six-axis motion mechanism further comprises a motion body 3 driven by and connected to the distal end of the connecting mechanism 2. In this embodiment, the motion member 3 is a submarine body (such as, a submarine). For example, the present invention is disposed in a wind tunnel or a water channel. The bottom of the support frame 1 is provided with a rail 4. The bottom end of the support frame 1 is provided with a wheel 11 corresponding to and rolling on the rail 4. The support frame 1 may be provided with a drive device (not shown in the drawings), such as a motor, to move the support frame 1 along the rail 4, such that the present invention can be adjusted in the wind tunnel or the water channel to generate displacement, velocity and acceleration and to get different the relative velocity in cooperation with the speed and wave motion of the water current in the water channel so as to enhance various kinetic characteristics of simulation greatly and to increase the range of measuring.

In an embodiment, the first, second and third drive mechanisms 21, 22, 23 are connected with and drives a slide 12, and the slide 12 is connected with and synchronously drives the first, second and third rotation mechanisms 24, 25, 26. Through the first, second and third drive mechanisms 21, 22, 23, the displacement, velocity and acceleration in the directions of the X-axis, the Y-axis, and the Z-axis of the first, second and third rotation mechanisms 24, 25, 26 are synchronously controlled.

In a preferable embodiment, the third drive mechanism 23 is disposed on the support frame 1. The first drive mechanism 21 is connected with a platform 13 to actuate the platform 13 in the direction of the Z-axis. The second drive mechanism 22 and the third drive mechanism 23 are disposed on the platform 13. Through the platform 13, the second drive mechanism 22, the third drive mechanism 23, and the slide 12 are synchronously ascended and descended.

As to the displacement in the directions of the X-axis, the Y-axis, and the Z-axis, in an embodiment as shown in FIG. 4 through FIG. 8, the first drive mechanism 21 further comprises a base 211. The base 211 is disposed on top of the platform 13. The base 211 is provided with a first drive motor 212 and pivotally connected with a first screw rod 213. The first drive motor 212 is connected with and drives a driving gear 214. The top of the support frame 1 is formed with a threaded hole 14. The screw rod 213 is screwed to the threaded hole 14. The first screw rod 213 is coaxially provided with a driven gear 215. The driving gear 214 meshes with the driven gear 215 to drive the driven gear 215.

The bottom of the platform 13 is provided with the second drive mechanism 22. The second drive mechanism 22 further comprises a second drive motor 221. The second drive motor 221 is connected with and drives a second screw rod 222. The second screw rod 22 is threadedly disposed to drive a first slide block 223. The first slide block 223 has a connecting hole 2231 for connection of the second screw rod 222. One side of the first slide block 223 is provided with the third drive mechanism 23.

The third drive mechanism 23 further comprises a third drive motor 231. The third drive motor 231 is connected with and drives a third screw rod 232. The slide 12 has another connecting hole 121. The third screw rod 232 is screwed to the connecting hole 121 to drive the slide 12.

For the displacement, velocity and acceleration in the direction of the Z-axis, the first drive motor 212 is actuated to turn the driving gear 214. The driving gear 214 meshes with the driven gear 215, so the driven gear 215 is driven to bring the first screw rod 213 to turn synchronously. The first screw rod 213 is threadedly connected with the threaded hole 14 of the support frame 1 to generate a force in the direction of the Z-axis to synchronously move the base 211 and the platform 13 in the direction of the Z-axis, and then the second drive mechanism 22, the third drive mechanism 23, the slide 12, and the first, second, and third rotation mechanisms 24, 25, 26 are synchronously moved in the direction of the Z-axis. It is noted that the first screw rod 213 is pivotally connected to the base 211. When the first screw rod 213 is turned, it is idle inside the base 211, not applying a force to the base 211 in the direction of turning. Therefore, a bearing may be provided between the first screw rod 213 and the base 211, but not limited to this.

Furthermore, the support frame 1 is further provided with at least one second slide rod 15 at one side thereof. The second slide rod 15 is provided with a third slide block 151. The third slide block 151 is connected with the platform 13 to keep the stability and precision of ascent and descent of the platform 13, so that the platform 13 won't be shaken and deflected by an external force.

For the displacement, velocity and acceleration in the direction of the Y-axis, the second drive motor 221 is actuated to turn the second screw rod 222. Through the second screw rod 222 screwed to the connecting hole 2231 of the first slide block 223, the first slide block 223 is moved up in the direction of the Y-axis. Preferably, two sides of the bottom end of the platform 13 are provided with two slide rails 131. The first slide block 223 is slidably mounted on one of the two slide rails 131. A second slide block 223' is slidably provided on the other of the two slide rails 131. The second slide block 223' is connected with the third drive mechanism 23. When the first slide block 223 is driven by the second screw rod 222 to move, the first slide block 223 synchronously brings the second slide block 223', the third drive mechanism 23, the slide 12, and the first, second, and third rotation mechanisms 24, 25, 26 to move synchronously in the direction of the Y-axis. In an embodiment, the slide rails 131 each have a concave portion 1311. The first slide block 223 and the second slide block 223' each have a convex portion 2232 corresponding to the concave portion 1311, enabling the first slide block 223 and the second slide block 223' to move stably in the direction of the Y-axis. The first slide block 223 and the second slide block 223' won't disengage from the slide rails 131 or deflect to enhance the precision of movement.

For the displacement, velocity and acceleration in the direction of the X-axis, the third drive motor 231 is actuated to turn the third screw rod 232 and further to bring the slide 12 to move in the direction of the X-axis. Preferably, at least one first slide rod 233 is provided between the first slide block 223 and the second slide block 223'. The slide 12 has a through hole 122 corresponding to the first slide rod 233, enabling the slide 12 driven by the third screw rod 232 to move stably in the direction of the X-axis.

For the rotation of the x-axis, the y-axis and the z-axis, in an embodiment, the first, second and third rotation mechanisms 24, 25, 26 can be robot arms. For example, the first rotation mechanism 24 further comprises a first pivot motor 241 disposed at the bottom end of the slide 12. The first pivot motor 241 is connected with and drives a first driving shaft 242. The first driving shaft 242 is connected to a first pivot member 243. The first pivot member 243 is provided with the second rotation mechanism 25.

The second rotation mechanism 25 comprises a second pivot motor 251 disposed in the first pivot member 243. The second pivot motor 251 is connected with and drives a second driving shaft 252. The second driving shaft 252 is connected to a second pivot member 253. The second pivot member 253 is provided with the third rotation mechanism 26.

The third rotation mechanism 26 comprises a third pivot motor 261 disposed in the second pivot member 253. The third pivot motor 261 is connected with and drives a third driving shaft 262. The third driving shaft 262 is connected with and drives the motion body 3. Preferably, the third driving shaft 262 is connected to the centroid O of the motion body 3.

Thereby, for the rotation angle θ, angular velocity, and angular acceleration generated by the rotation in the direction of the x-axis, the first pivot motor 241 is actuated to drive the first driving shaft 242 and to rotate the first pivot member 243, enabling the first pivot member 243 to bring the second rotation mechanism 25, the third rotation mechanism 26 and the motion body 3 to rotate about the x-axis.

For the rotation angle φ, angular velocity, and angular acceleration generated by the rotation in the direction of the y-axis, the second pivot motor 251 is actuated to drive the second driving shaft 252 and to rotate the second pivot member 253, enabling the second pivot member 253 to bring the third rotation mechanism 26 and the motion body 3 to rotate about the y-axis.

For the rotation angle Ψ, angular velocity, and angular acceleration generated by the rotation in the direction of the z-axis, the third pivot motor 261 is actuated to drive the third driving shaft 262 or the third pivot member 263 through the third driving shaft 262, enabling the third driving shaft 262 or the third pivot member 263 to directly bring the motion body 3 to rotate about the z-axis.

It is noted that the first, second and third drive mechanisms 21, 22, 23, the first rotation mechanism 24 and the second rotation mechanism 25, namely, the five axes, the movement of the X-axis, the Y-axis and the Y-axis as well as the rotation of the x-axis and the y-axis, are interconnected with another other. The rotation of the third rotation mechanism 26 can be controlled separately.

Thereby, the present invention combines the three translation axes in the directions of the X-axis, the Y-axis, and the Z-axis and the three rotation axes in the directions of the x-axis, the y-axis, and the z-axis to carry out a six-axis compound motion, including the displacement, velocity and acceleration of the X-axis, the Y-axis, and the Z-axis and the rotation angle (θ, φ, Ψ), angular velocity, and angular acceleration of the x-axis, the y-axis, and the z-axis. Thereby, the submarine can proceed its rotation and displacement at any angle, without any limitation. For example, when the centroid O is immovable, the submarine can be controlled for its rotation, yawing, and pitching to imitate a single motion of rolling, yawing and pitching and a compound motion of the submarine. In cooperation with the control of the water current in the wind tunnel or the water channel, the six-axis motion mechanism imitates the complicated motion of the submarine and measures the force and the moment of force in motion to calculate the hydrokinetic parameter of a fluid so as to measure its motion performance. This is beneficial for the development of submarines.

Figure 9:
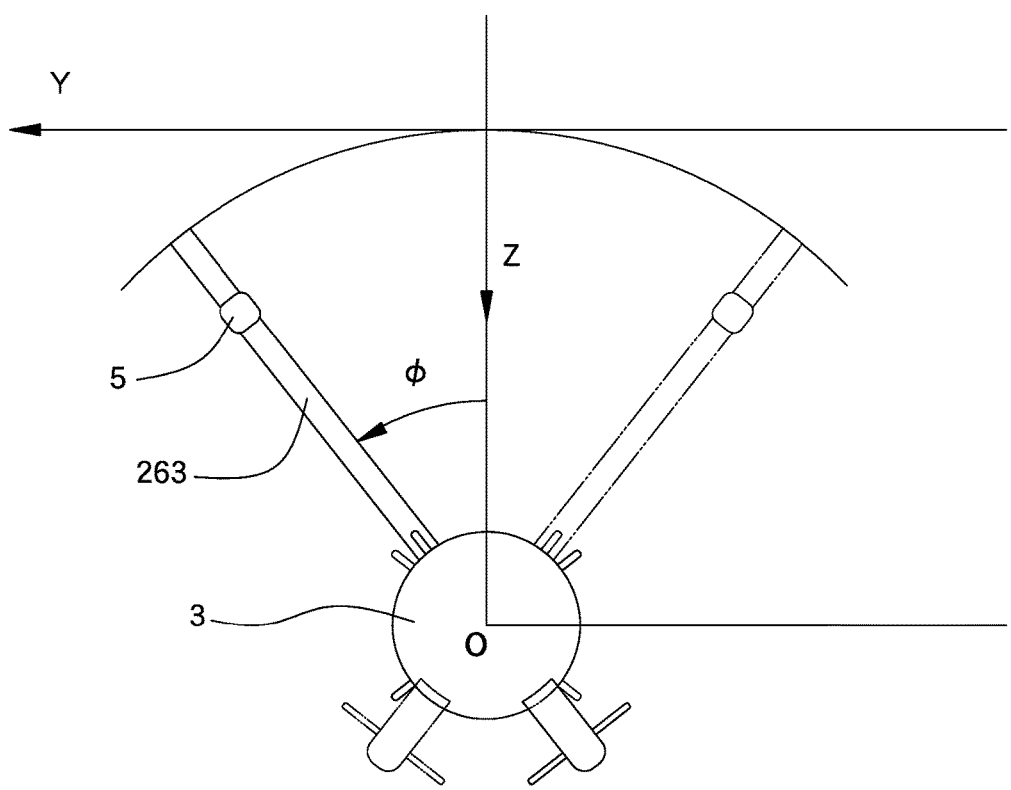
FIG. 9 is a dynamic schematic view of the submarine body of the present invention in a rolling motion.

For example, when the centroid O is immobile, the submarine proceeds a rolling motion (namely, the submarine is rotated about the y-axis to generate the rotation angle φ, angular velocity, and angular acceleration). As shown in FIG. 9, the quantities of the rotation and displacement of the X-axis, the x-axis and the z-axis are zero, namely, the third drive mechanism 23, the first rotation mechanism 24 and the third rotation mechanism 26 don't actuate. The rolling is done through the compound motion of the Y-axis, the Z-axis, and the y-axis. Through the synchronous action of the first drive mechanism 21, the second drive mechanism 22, and the second rotation mechanism 25, the rolling motion is achieved.

Figure 10:
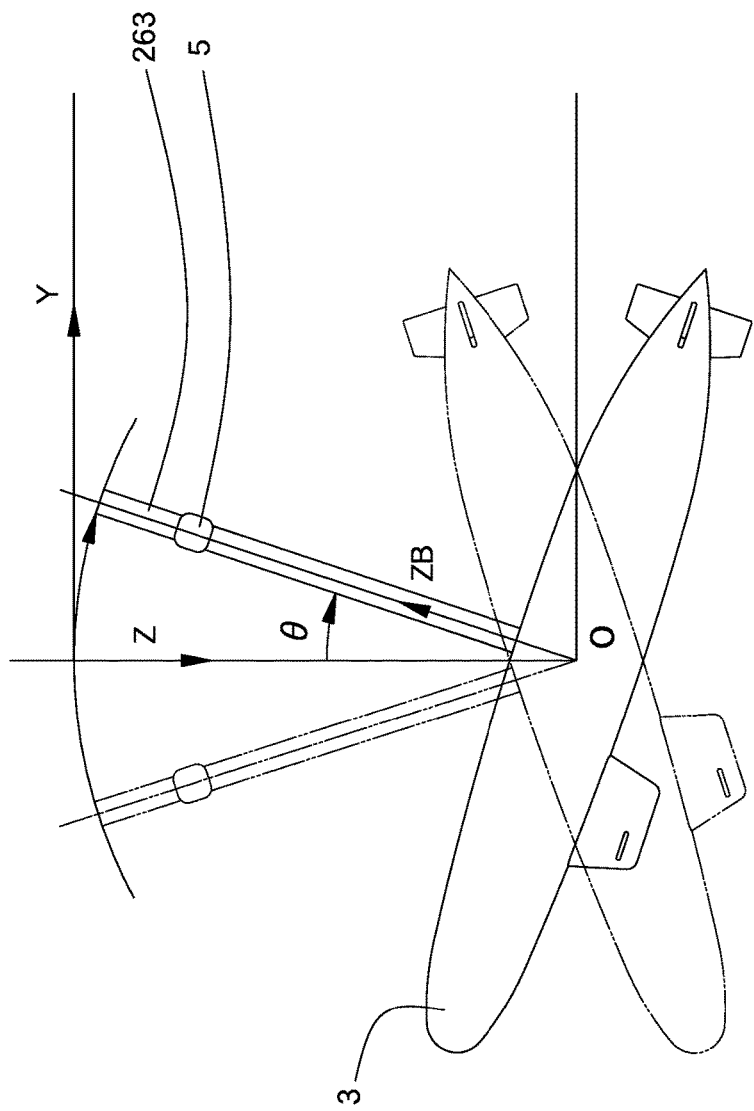
FIG. 10 is a dynamic schematic view of the submarine body of the present invention in a pitching.

Similarly, as shown in FIG. 10, when the submarine proceeds a pitching motion (namely, the submarine is rotated about the x-axis to generate the rotation angle θ, angular velocity, and angular acceleration), the quantities of the rotation and displacement of the X-axis, the y-axis, and the z-axis are zero, namely, the third drive mechanism 23, the second rotation mechanism 25 and the third rotation mechanism 26 don't actuate. The pitching is done through the compound motion of the Y-axis, the Z-axis and the x-axis. Through the synchronous action of the first drive mechanism 21, the second drive mechanism 22, and the first rotation mechanism 24, the pitching motion is achieved.

It is noted that the third driving shaft 262 is connected to the centroid O of the motion body 3. No matter which motion is done, namely, the pitching motion about the x-axis, the rolling motion about the y-axis, or the yawing motion about the z-axis, the position of the centroid O of the motion body 3 is immovable and not deviated. This is beneficial to measure the physical quantity and parameter of the fluid at various angles for the motion body 3. The third driving shaft 262 may be provided with a dynamic measuring unit 5 to measure the parameter of the fluid.

In order to record and measure the parameter of the fluid, in a preferable embodiment, the support frame 1 is provided with a counterweight device 6. The counterweight device 6 is connected with the platform 13 to support the platform 13. The counterweight device 6 comprises at least one pulley set 61, a driving wire 62, and a counterweight member 63. The pulley set 61 is disposed on the support frame 1. The driving wire 62 is disposed around the pulley set 61. One end of the driving wire 62 is connected to the platform 13, and another end of the driving wire 62 is connected to the counterweight member 63. The weight of the counterweight member 63 is substantially equal to the weight supported by the platform 13 minus the weight of the motion body 3. This is beneficial for controlling the motion in the direction of the Z-axis. Only the torsion of the first drive motor 212 is required to be controlled for the weight of the submarine body itself. According to the torsion of the first drive motor 212, the weight of the submarine body and the stress in the direction of the Z-axis can be calculated.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A six-axis motion mechanism, comprising:
a movable support frame, provided with a connecting mechanism, the connecting mechanism defining three translation axes in the directions of the X-axis, the Y-axis, and the Z-axis respectively and three rotation axes in the directions of the x-axis, the y-axis, and the z-axis respectively;
the connecting mechanism being provided with drive mechanisms in the directions of the X-axis, the Y-axis, and the Z-axis for controlling displacement, velocity and acceleration in the directions of the X-axis, the Y-axis, and the Z-axis respectively; rotation mechanisms being provided in the directions of the x-axis, the y-axis, and the z-axis for controlling rotation angles ($\theta$, $\varphi$, $\Psi$), angular velocity, and angular acceleration in the directions of the x-axis, the y-axis, and the z-axis respectively; and
a motion body, connected to and driven by a distal end of the connecting mechanism;
wherein the drive mechanisms include a first drive mechanism actuating in the direction of the Z-axis, a second drive mechanism actuating in the direction of the Y-axis, and a third drive mechanism actuating in the direction of the X-axis; the rotation mechanisms include a first rotation mechanism actuating in the direction of the x-axis and coupled to the third drive mechanism, a second rotation mechanism actuating in the direction of the y-axis and pivotally connected to the first rotation mechanism, and a third rotation mechanism actuating in the direction of the z-axis and pivotally connected to the second rotation mechanism; the first, second and third drive mechanisms are connected with and drive a slide, and the slide is connected with and drives the first, second and third rotation mechanisms synchronously.

2. The six-axis motion mechanism as claimed in claim 1, wherein the third drive mechanism is disposed on the support frame, the first drive mechanism is connected with a platform to actuate the platform in the direction of the Z-axis, and the second drive mechanism and the third drive mechanism are disposed on the platform.

3. The six-axis motion mechanism as claimed in claim 2, wherein the first drive mechanism further includes a base, the base is disposed on top of the platform, the base is provided with a first drive motor and pivotally connected with a first screw rod; the first drive motor is connected with and drives a driving gear; a top of the support frame is formed with a threaded hole, the first screw rod is screwed to the threaded hole, the first screw rod is coaxially provided with a driven gear, and the driving gear meshes with the driven gear to drive the driven gear.

4. The six-axis motion mechanism as claimed in claim 2, wherein a bottom of the platform is provided with the second drive mechanism, the second drive mechanism further includes a second drive motor, the second drive motor is connected with and drives a second screw rod; the second screw rod is threadedly disposed to drive a first slide block, the first slide block has a connecting hole for connection of the second screw rod, and one side of the first slide block is provided with the third drive mechanism.

5. The six-axis motion mechanism as claimed in claim 4, wherein the third drive mechanism further includes a third drive motor, the third drive motor is connected with and drives a third screw rod; the slide has another connecting hole, and the third screw rod is screwed to the connecting hole of the slide to drive the slide.

6. The six-axis motion mechanism as claimed in claim 4, wherein two sides of a bottom end of the platform are provided with two slide rails, the first slide block is slidably mounted on one of the two slide rails; a second slide block is slidably provided on the other of the two slide rails, the second slide block is connected with the third drive mechanism, such that the first slide block, the second slide block, and the third drive mechanism are moved synchronously.

7. The six-axis motion mechanism as claimed in claim 6, wherein the third drive mechanism further includes a third drive motor, the third drive motor is connected with and drives a third screw rod; the third screw rod is connected with the second slide block and idle, the slide has another connecting hole, and the third screw rod is screwed to the connecting hole of the slide to drive the slide.

8. The six-axis motion mechanism as claimed in claim 7, wherein at least one first slide rod is provided between the first slide block and the second slide block, the slide has a through hole corresponding to the first slide rod, and the first slide rod is mounted to the slide through the through hole.

9. The six-axis motion mechanism as claimed in claim 1, wherein the first rotation mechanism further includes a first pivot motor disposed at a bottom end of the slide, the first pivot motor is connected with and drives a first driving shaft, the first driving shaft is connected to a first pivot member, the first pivot member is provided with the second rotation mechanism; the second rotation mechanism includes a second pivot motor disposed in the first pivot member, the second pivot motor is connected with and drives a second driving shaft, the second driving shaft is connected to a second pivot member, the second pivot member is provided with the third rotation mechanism; the third rotation mechanism includes a third pivot motor disposed in the second pivot member, the third pivot motor is connected with and drives a third driving shaft, and the third driving shaft is connected with and drives the motion body.

10. The six-axis motion mechanism as claimed in claim 9, wherein the third driving shaft is provided with a dynamic measuring unit.

11. The six-axis motion mechanism as claimed in claim 9, wherein the third driving shaft is connected to a centroid of the motion body.

12. The six-axis motion mechanism as claimed in claim 2, wherein the support frame is provided with a counterweight device, and the counterweight device is connected with the platform to support the platform.

13. The six-axis motion mechanism as claimed in claim 12, wherein the counterweight device includes at least one pulley set, a driving wire, and a counterweight member, the pulley set is disposed on the support frame, the driving wire is disposed around the pulley set, one end of the driving wire is connected to the platform, another end of the driving wire is connected to the counterweight member; the weight of the counterweight member is substantially equal to the weight supported by the platform minus the weight of the motion body.

14. The six-axis motion mechanism as claimed in claim 2, wherein the support frame is further provided with at least one second slide rod at one side thereof, the second slide rod is provided with a third slide block, and the third slide block is connected with the platform.

15. The six-axis motion mechanism as claimed in claim 1, further comprising a rail, a bottom end of the support frame being provided with a wheel corresponding to and rolling on the rail.

16. The six-axis motion mechanism as claimed in claim 15, wherein the support frame is provided with a drive device, and the drive device is adapted to drive or retain the support frame.

17. The six-axis motion mechanism as claimed in claim 1, wherein the support frame is disposed in a wind tunnel or a water channel.

18. The six-axis motion mechanism as claimed in claim 1, wherein the motion member is a submarine body.

* * * * *